United States Patent [19]

Kondo

[11] 4,367,856

[45] Jan. 11, 1983

[54] REEL SHAFT BRAKING DEVICE OF MAGNETIC RECORDING TAPE RUNNING APPARATUS

[75] Inventor: Shiro Kondo, Chofu, Japan

[73] Assignee: Olympus Optical Co., Ltd., Tokyo, Japan

[21] Appl. No.: 259,562

[22] Filed: May 1, 1981

[30] Foreign Application Priority Data

May 9, 1980 [JP] Japan .............................. 55-63622[U]

[51] Int. Cl.³ .......................... G03B 1/04; G11B 15/32
[52] U.S. Cl. ..................................... 242/204; 242/198; 360/132
[58] Field of Search ................................ 242/198–200, 242/204, 206–210; 360/74.1, 93, 132, 105, 96.1

[56] References Cited

U.S. PATENT DOCUMENTS

| | | | |
|---|---|---|---|
| 3,366,342 | 1/1968 | Nieland et al. | 242/204 |
| 3,448,940 | 6/1969 | Atsumi | 242/204 |
| 3,670,992 | 6/1972 | Goshima et al. | 242/204 |
| 3,893,186 | 7/1975 | Yoshii | 360/105 |
| 3,934,270 | 1/1976 | Iwata | 242/198 |

*Primary Examiner*—Leonard D. Christian
*Attorney, Agent, or Firm*—Frishauf, Holtz, Goodman & Woodward

[57] ABSTRACT

A reel shaft braking device used in a magnetic recording tape running apparatus with a pair of reel shafts comprises a first lever to rock between a first position where one end portion thereof abuts against the one reel shaft and a second position where the one end portion is separated from the one reel shaft, the other end portion of the first lever having an opening provided with a pair of edges; a second lever to rock between a first position where one end portion thereof abuts against the other reel shaft and a second position where the one end portion of the second lever is separated from the other reel shaft; a projection fixed to the other end portion of the second lever, the projection being separated from the edges of the first lever when two levers are located in their positions, and abutting against one of the edges to locate the second lever in the second position when the first lever is located in the second position; and abutting against the other of the edges to locate the first lever in the second position when the second lever is located in the second position, a pair of coil springs for urging the two levers toward their first positions. When the one or the other reel shaft serves as a take-up reel shaft the second or first lever is shifted toward the second position by shifting the first or second lever toward the second position.

3 Claims, 4 Drawing Figures

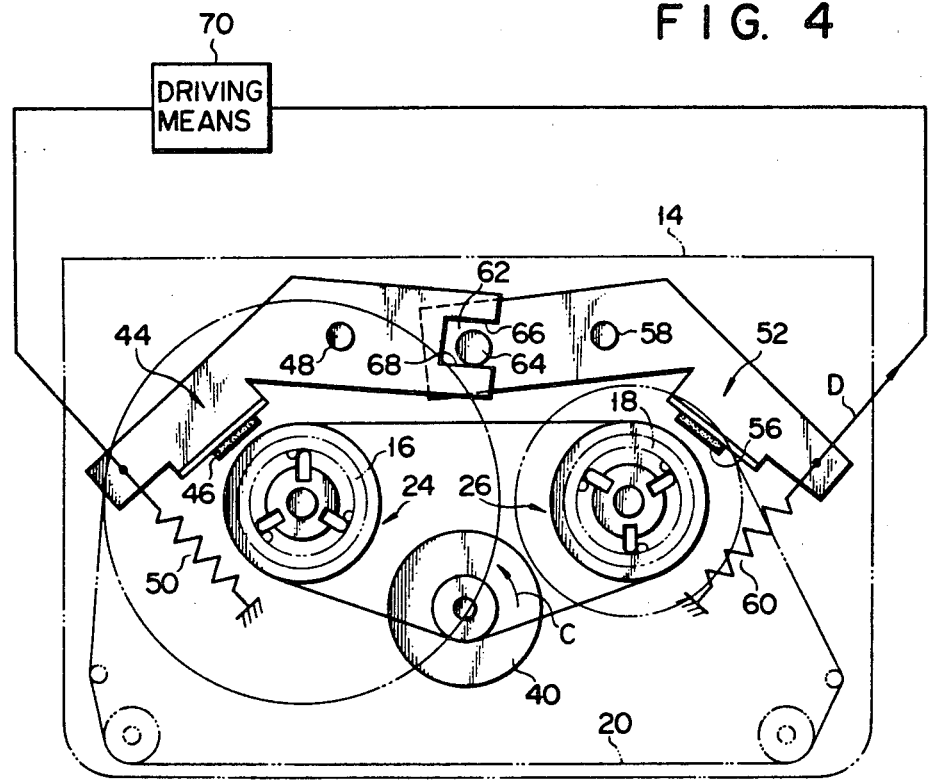

REEL SHAFT BRAKING DEVICE OF MAGNETIC RECORDING TAPE RUNNING APPARATUS

BACKGROUND OF THE INVENTION

This invention relates to a reel shaft braking device used in a magnetic recording tape running apparatus having a pair of reel shafts.

In a braking operation of a prior art reel shaft braking device, it is uncertain which of supply and take-up reel shafts is the first to cease to rotate. If the take-up reel shaft is stopped ahead of the supply reel shaft by the braking operation, a magnetic recording tape which is wound around a pair of reel hubs respectively mounted on a pair of reel shafts, will slacken at and between the reel hubs.

SUMMARY OF THE INVENTION

The object of this invention is to provide a simple-construction reel shaft braking device of a magnetic recording tape running apparatus which is sure to stop the rotation of the supply reel shaft before stopping the rotation of the take-up reel shaft in a braking operation.

BRIEF DESCRIPTION OF THE DRAWINGS

FIG. 4 is a plan view showing a state obtained when the first lever of FIG. 2 is located in its second position by locating the second lever in its second position.

Now there will be described a preferred embodiment of this invention with reference to the accompanying drawings.

DETAILED DESCRIPTION OF THE PREFERRED EMBODIMENT

Figure 1:
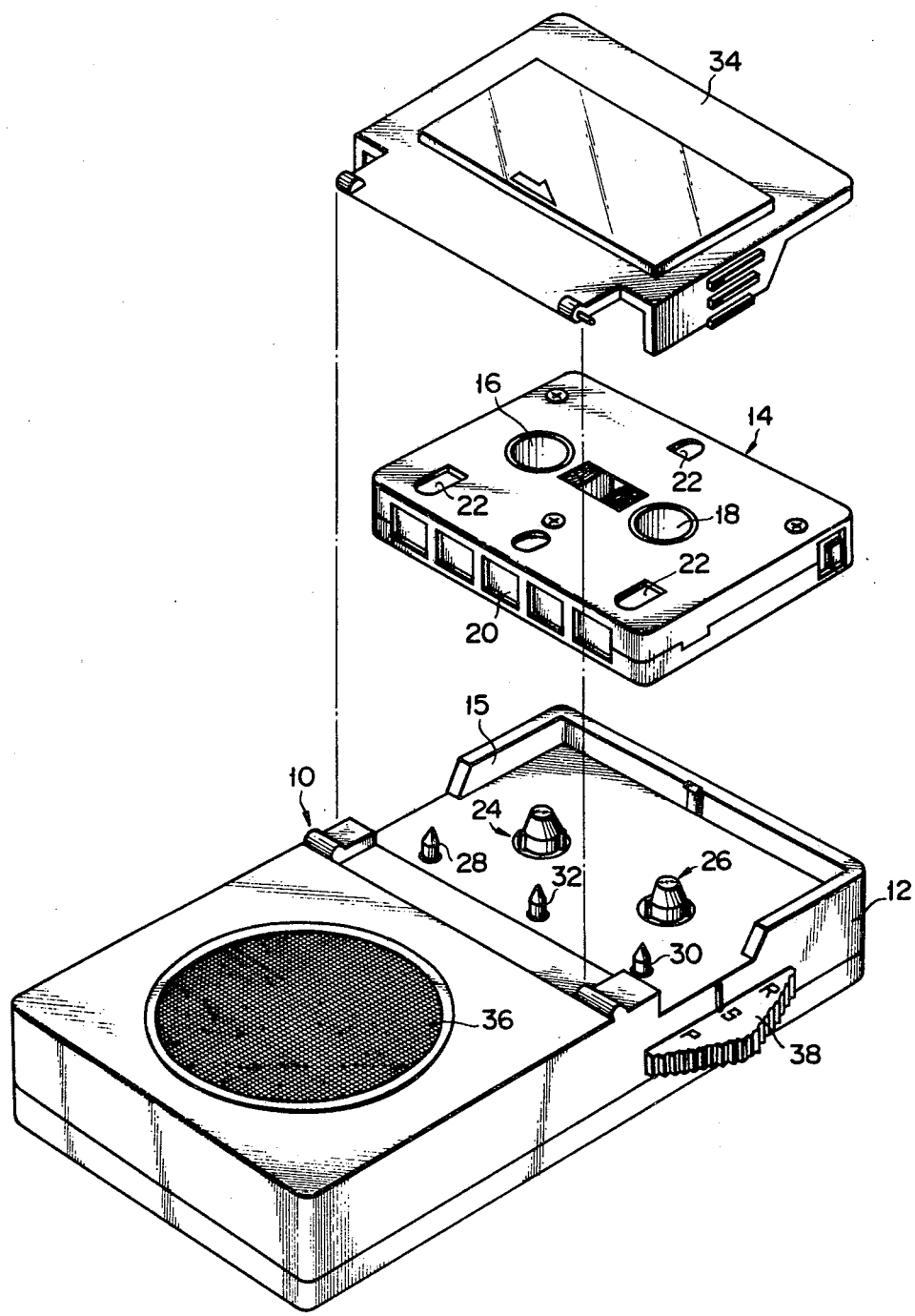
FIG. 1 is a perspective view of a magnetic recording tape running apparatus provided with a reel shaft braking device according to an embodiment of this invention.

Referring now to FIG. 1, there is shown a magnetic recording tape running apparatus 10. In this embodiment, the magnetic recording tape running apparatus 10 is a tape recorder. A mounting hollow 15 for setting a tape cassette 14 is defined in a housing 12 of the magnetic recording tape running apparatus 10. The tape cassette 14 is provided with a pair of reel hubs 16 and 18, a magnetic recording tape 20 wound around the wheel hubs 16 and 18, and a plurality of holes 22 for cassette locating pins. From the mounting hollow 15 protrude a pair of reel shafts 24 and 26 on which the reel hubs 16 and 18 of the tape cassette 14 are to be fitted respectively, cassette locating pins 28 and 30 to be inserted in the holes 22 of the tape cassette 14 to locate the tape cassette 14 in the mounting hollow 15, and a capstan 32. The magnetic recording tape running apparatus 10 is further provided with a cover 34 for covering the mounting hollow 15. The housing 12 is provided with a speaker 36 and a selector switch 38 for setting the apparatus 10 for various modes such as STOP, PLAY, FF (fast forward), REWIND, and RECORD modes.

The reel shafts 24 and 26 are rotatably mounted on a chassis (not shown) contained in the housing 12 of the magnetic recording tape running apparatus 10. The chassis is fitted with a bidirectional electric motor 40 (hereinafter referred to as a motor) which can rotate in both clockwise and counterclockwise directions with the same characteristics, as shown in FIG. 2.

Figure 2:
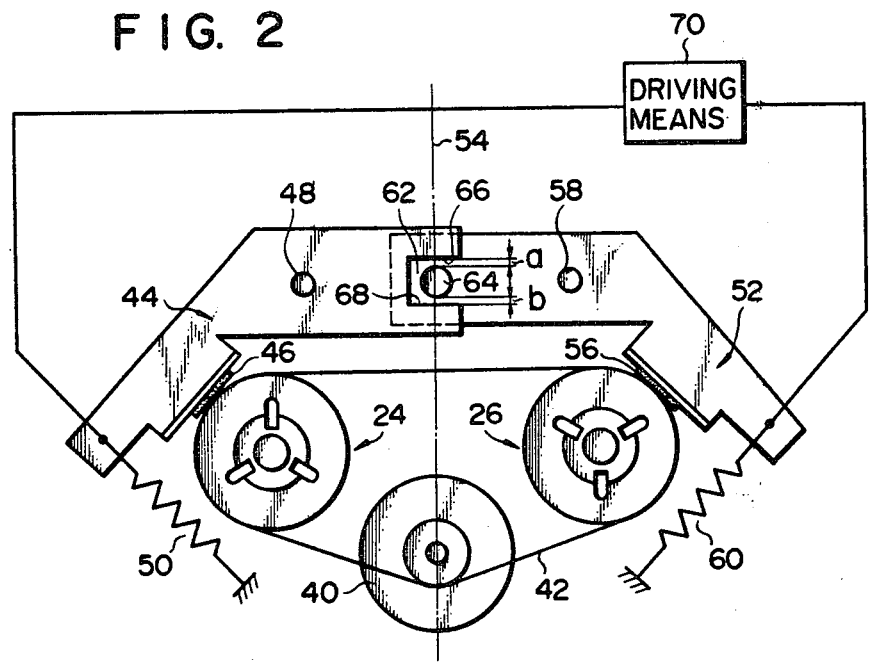
FIG. 2 is a plan view schematically showing the principal mechanism of the reel shaft braking device, in which first and second levers are located in their respective first positions.

As shown in FIG. 2, a driving belt 42 is stretched between the output shaft of the motor 40 and the two reel shafts 24 and 26. Therefore, the reel shafts 24 and 26 rotate clockwise as the motor 40 rotates clockwise, and rotate counterclockwise as the motor 40 rotates counterclockwise.

As shown in FIG. 2, a first lever 44 is disposed in the vicinity of the one reel shaft 24. The first lever 44 retains at one end portion thereof a first friction member 46 formed of e.g. rubber or felt. The middle portion of the first lever 44 is rockably mounted on the chassis by means of a fixed pivot 48. The first lever 44 can rock around the pivot 48 within a plane intersecting the axis of rotation of the reel shaft 24. The reel shaft 24 is located within the movement locus of the first friction member 46. A first urging means 50 is fixed to the one end portion of the first lever 44. In this embodiment, the first urging means 50 is formed of a tension coil spring. The first urging means 50 extends from the one end portion of the first lever 44 along the counterclockwise direction around the pivot 48 of the first lever 44, and is tensely fixed to the chassis. Thus, the first lever 44 is continually urged to rock in the counterclockwise direction by the urging force of the first urging means 50. Normally, the first friction member 46 is always in contact with the reel shaft 24 to be frictionally engaged therewith, thereby preventing the reel shaft 24 from rotating. The position of the first lever 44 where the first friction member 46 is in contact with the reel shaft 24 is defined as a first position of the lever 44.

As shown in FIG. 2, a second lever 52 is disposed in the vicinity of the other reel shaft 26. A combination of the first and second levers 44 and 52 is bisymmetrical with respect to an imaginary straight line 54 extending halfway between the two reel shafts 24 and 26 at right angles to another imaginary straight line which passes through the centers of rotation of the reel shafts 24 and 26. A second friction member 56 formed of e.g. rubber or felt is retained in a position corresponding to the first friction member 46 on the opposite side of the straight line 54, at one end portion of the second lever 52. Further, the second lever 52 is rockably mounted on the chassis by means of a fixed pivot 58 at that middle portion thereof which corresponds to the pivot 48 on the opposite side of the straight line 54. The second lever 52 can rock around the pivot 58 within a plane intersecting the axis of rotation of the reel shaft 26. The reel shaft 26 is located within the movement locus of the second friction member 56. A second urging means 60 is fixed to the one end portion of the second lever 52. In this embodiment, the second urging means 60 is formed of a tension coil spring. The second urging means 60 extends from the one end portion of the second lever 52 along the clockwise direction around the pivot 58 of the second lever 52 so as to correspond to the first urging means 50 on the opposite side of the straight line 54, and is tensely fixed to the chassis.

Thus, the second lever 52 is continually urged to rock in the clockwise direction by the urging force of the second urging means 60. Normally, the second friction member 56 is always in contact with the reel shaft 26 to be frictionally engaged therewith, thereby preventing the reel shaft 26 from rotating. The position of the second lever 52 where the second friction member 56 is in contact with the reel shaft 26 is defined as a first position of the lever 52.

As shown in FIG. 2, the other end portion of the first lever 44 is disposed halfway between the respective pivots 48 and 58 of the first and second levers 44 and 52. The other end portion of the second lever 52 crosses the other end portion of the first lever 44. Defined at the other end portion of the first lever 44 is an opening 62 which opens in the direction to cross the movement locus of the other end portion of the first lever 44 obtained when the first lever 44 rocks around the pivot 48. A projection 64 protruding toward the other end portion of the first lever 44 is fixed to the other end portion of the second lever 52 at a point on the straight line 54. The projection 64 is inserted in the opening 62 at the other end portion of the first lever 44. The opening 62 is provided with a pair of edges 66 and 68 extending along the direction to cross the movement locus of the other end portion of the first lever 44 and spaced from each other. The projection 64 is at a given distance "a" from one edge 66 along the movement direction of the other end portion of the second lever 52. The projection 64 is at a given distance "b" from the other edge 68 along the movement direction of the other end portion of the second lever 52. In this embodiment, the distance "a" is the same as the distance "b."

As shown in FIG. 2, the respective one end portions of the first and second levers 44 and 52 are coupled with a driving means 70 which interlocks with the selector switch 38 shown in FIG. 1. When the selector switch 38 is operated to set the magnetic recording tape running apparatus 10 for any other mode than the STOP mode with the one reel shaft 24 serving as a take-up reel shaft (i.e., when the apparatus 10 is set for the PLAY, FF or RECORD mode in this embodiment), the driving means 70 drives the first lever 44 to move from its first position as shown in FIG. 2 in the direction of an arrow B of FIG. 3 against the urging force of the first urging means 50, thereby separating the first friction member 46 of the first lever 44 from the reel shaft 24. When the selector switch 38 is operated to set the magnetic recording tape running apparatus 10 for any other mode than the STOP mode with the other reel shaft 26 serving as the take-up reel shaft (i.e., when the apparatus 10 is set for the REWIND mode in this embodiment), on the other hand, the driving means 70 drives the second lever 52 to move from its first position as shown in FIG. 2 in the direction of an arrow D of FIG. 4 against the urging force of the second urging means 60, thereby separating the second friction member 56 of the second lever 52 from the reel shaft 26.

In this embodiment, the distance between the first friction member 46 and the pivot 48 of the first lever 44 is equal to the distance between the second friction member 56 and the pivot 58 of the second lever 52. Also, the distance between the pivot 48 of the first lever 44 and the projection 64 of the second lever 52 is equal to the pivot 58 of the second lever 52 to the projection 64.

Now there will be described the operation of the embodiment constructed in the above-mentioned manner.

Figure 3:
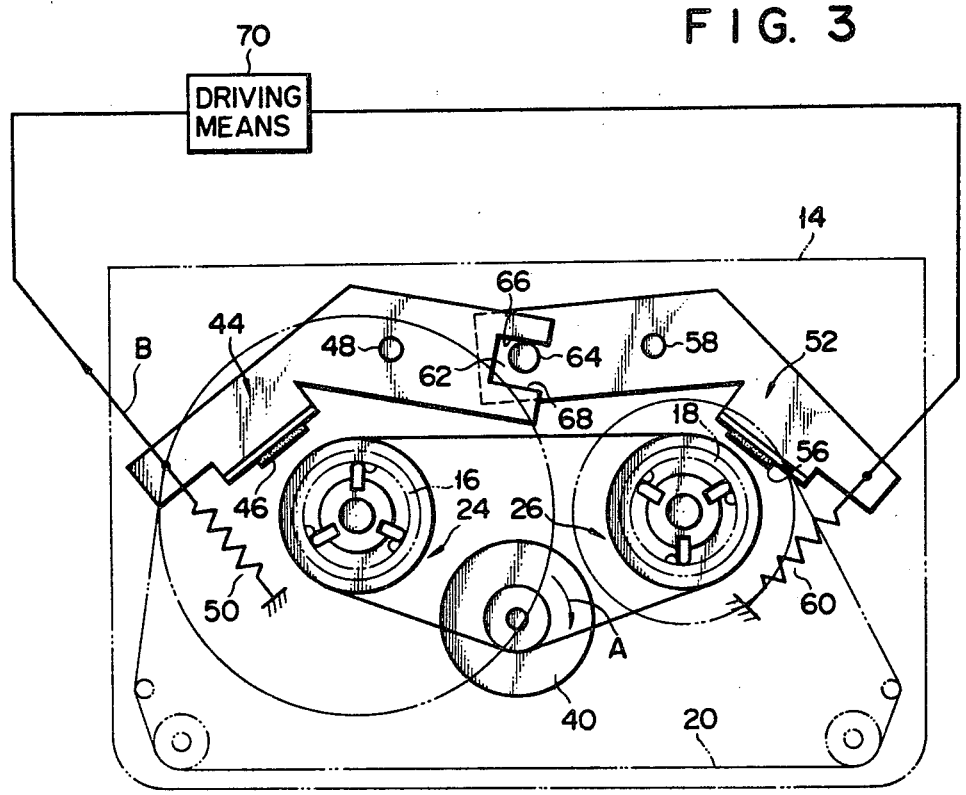
FIG. 3 is a plan view showing a state obtained when the second lever of FIG. 2 is located in its second position by locating the first lever in its second position.

Let it be supposed that the reel shafts 24 and 26 are mounted respectively with the reel hubs 16 and 20 on which the magnetic recording tape 20 of the tape cassette 14 is wound, as shown in FIG. 3. The selector switch 38 of the magnetic recording tape running apparatus 10 is operated to set the apparatus 10 for one of the PLAY, FF and RECORD modes. Then, the one end portion of the first lever 44 is driven to move in the direction of the arrow B by the driving means 70, so that the first lever 44 rocks clockwise against the urging force of the first urging means 50 to separate the first friction member 46 from the one reel shaft 24, as shown in FIG. 3. The position of the first lever 44 where the first friction member 46 separate from the reel shaft 24 is defined as a second position of the lever 44. Meanwhile, the motor 40 rotates its output shaft in the direction of an arrow A of FIG. 3. At the same time, the reel shafts 24 and 26 rotate in the direction of the arrow A, so that the magnetic recording tape 20 is transferred from the other reel hub 18 to the one reel hub 16. That is, the one reel shaft 24 serves as the take-up reel shaft, while the other reel shaft 26 serves as a supply reel shaft.

When the first lever 44 is shifted from its first position to the second, one edge 66 of the opening 62 of the first lever 44 abuts against the projection 64 of the second lever 58, as shown in FIG. 3. Engaged with the edge 66, the second lever 52 is rocked counterclockwise by the turning force of the first lever 44 against the urging force of the second urging means 60, thereby separating the second friction member 56 from the other reel shaft 26, as shown in FIG. 3. The position of the second lever 52 where the second friction member 56 separates from the reel shaft 26 is defined as a second position of the lever 52.

As shown in FIG. 3, the distance between the first friction member 46 of the first lever 44 in its second position and the one reel shaft 24 is greater than the distance between the second friction member 56 of the second lever 52 in its second position and the other reel shaft 26. This is so because, in the initial stage of the rocking from the first position to the second, the first lever 44 must rock farther than the second lever 50 does by an angular distance corresponding to the distance "a."

Now let it be supposed that the selector switch 38 of the magnetic recording tape running apparatus 10 is operated to set the apparatus 10 for the STOP mode. At this time, the motor 40 runs its output shaft by the force of inertia, and the first lever 44 is released from the drive by the driving means 70. The first and second levers 44 and 52 are rocked from their respective second positions shown in FIG. 3 to the first positions shown in FIG. 2 by the urging force of the first and second urging means 50 and 60, respectively. After the second friction member 56 of the second lever 52 abuts against the other reel shaft 26 serving as the supply reel shaft, the first friction member 46 of the first lever 44 abuts against the one reel shaft 24 serving as the take-up reel shaft. Accordingly, the magnetic recording tape 20 will never slacken at and between the reel hubs 16 and 18.

Hereupon, the selector switch 38 of the magnetic recording tape running apparatus 10 is operated to set the apparatus for the REWIND mode.

Then, the one end portion of the second lever 52 is driven to move in the direction of the arrow D by the driving means 70, so that the second lever 52 rocks counterclockwise against the urging force of the second urging means 60 to separate the second friction member 56 from the other reel shaft 26 and to be located in its second position, as shown in FIG. 4. Meanwhile, the motor 40 rotates its output shaft in the direction of an arrow C of FIG. 4. At the same time, the reel shafts 24 and 26 rotate in the direction of the arrow C, so that the magnetic recording tape 20 is transferred from the one reel hub 16 to the other reel hub 18. That is, the other reel shaft 26 serves as the take-up reel shaft, while the one reel shaft 24 serves as the supply reel shaft.

When the second lever 52 is shifted from its first position to the second, the projection 64 of the second lever 52 abuts against the other edge 68 of the opening 62 of the first lever 44, as shown in FIG. 4. Engaged with the projection 64, the first lever 44 is rocked clockwise by the turning force of the second lever 52 against the urging force of the first urging means 50, thereby separating the first friction member 46 from the one reel shaft 24 to be located in its second position, as shown in FIG. 4.

As shown in FIG. 4, the distance between the second friction member 56 of the second lever 52 in its second position and the other reel shaft 26 is greater than the distance between first friction member 46 of the first lever 44 in its second position and the one reel shaft 24. This is so because, in the initial stage of the rocking from the first position to the second, the second lever 52 must rock farther than the first lever 44 does by an angular distance corresponding to the distance "b."

Now let it be supposed that the selector switch 38 of the magnetic recording tape running apparatus 10 is operated to set the apparatus 10 for the STOP mode. At this time, the motor 40 runs its output shaft by the force of inertia, and the second lever 52 is released from the drive by the driving means 70. The second and first levers 52 and 44 are rocked from their respective second positions shown in FIG. 4 to the first positions shown in FIG. 2 by the urging force of the second and first urging means 60 and 50, respectively. After the first friction member 46 of the first lever 44 abuts against the one reel shaft 24 serving as the supply reel shaft, the second friction member 56 of the second lever 52 abuts against the other reel shaft 26 serving as the take-up reel shaft. Accordingly, the magnetic recording tape 20 will never slacken at and between the reel hubs 16 and 18.

According to this invention, there is provided a reel shaft braking device which is used in a magnetic recording tape running apparatus with a pair of reel shafts, and comprises a first lever pivotally mounted at the middle portion thereof so as to be able to rock within a plane intersecting the axis of rotation of one of the pair of reel shafts between a first position where one end portion of the first lever abuts against the one reel shaft to be frictionally engaged therewith and a second position where the one end portion is separated from the one reel shaft, the other end portion of the first lever having an opening provided with a pair of edges which extend along the direction to intersect the movement locus of the other end portion and are spaced from each other; a second lever pivotally mounted at the middle portion thereof so as to be able to rock within a plane intersecting the axis of rotation of the other of the pair of shafts between a first position where one end portion of the second lever abuts against the other reel shaft to be frictionally engaged therewith and a second position where the one end portion is separated from the other reel shaft; a projection fixed to the other end portion of the second lever, the projection being separated from the pair of edges of the first lever when the first and second levers are located in their respective first positions, and abutting against one of the pair of edges to locate the second lever in the second position thereof when the first lever is located in the second position thereof, and abutting against the other of the pair of edges to locate the first lever in the second position thereof when the second lever is located in the second position thereof; an urging means for urging the first and second levers toward their respective first positions; and a driving means for shifting the second lever from the first position to the second position thereof by shifting the first lever from the first position to the second position thereof when the one reel shaft serves as a take-up reel shaft, and for shifting the first lever from the first position to the second position thereof by shifting the second lever from the first position to the second position thereof when the other reel shaft serves as the take-up reel shaft. With such arrangement, as described above, a magnetic recording tape will never slacken at or between a pair of reel hubs mounted on the pair of reel shafts when the rotating reel shafts stop.

According to a preferred embodiment of the invention, the distance between the one end portion of the first lever and the center of rocking of the first lever is equal to the distance between the one end portion of the second lever and the center of rocking of the second lever, and the distance between the center of rocking of the first lever and the projection is equal to the distance between the center of rocking of the second lever and the projection. Such arrangement can facilitate the design of the reel shaft braking device.

According to the preferred embodiment of the invention, moreover, the distance between the projection and one of the pair of edges on the movement locus of the projection is equal to the distance between the projection and the other of the pair of edges on the movement locus when the first and second levers are located in their respective first positions. Such arrangement can facilitate the design of the reel shaft braking device.

Although an illustrative embodiment of this invention has been described in detail herein, it is to be understood that the invention is not limited to such embodiment, and that various changes and modifications may be effected therein by one skilled in the art without departing from the scope or spirit of the invention.

For example, the second lever 52 need not be located in the position which corresponds to the first lever 44 on the opposite side of the imaginary straight line 54. That is, the combination of the first and second levers 44 and 52 need not be bisymmetrical with respect to the straight line 54. Further, the pivot 58 of the second lever 52 need not be located in the position which corresponds to the pivot 48 of the first lever 44 on the opposite side of the straight line 54. Likewise, the second urging means 60 need not be located in the position which corresponds to the first urging means 50 on the opposite side of the straight line 54. Furthermore, the first and second urging means 50 and 60 may be replaced by a coil spring which is attached at one end thereof to the one end portion of the first lever 44 and at the other end thereof to the one end portion of the second lever 52. The distance "a" need not equal to the distance "b."

What is claimed is:

1. A reel shaft braking device used in a magnetic recording tape running apparatus with a pair of reel shafts, comprising:
   a first lever pivotally mounted at the middle portion thereof so as to be able to rock within a plane intersecting the axis of rotation of one of said pair of reel shafts between a first position where one end portion of said first lever abuts against said one reel shaft to be frictionally engaged therewith and a second position where said one end portion is separated from said one reel shaft, the other end portion of said first lever having an opening provided with a pair of edges which extend along a direction to intersect the movement locus of said other end portion and are spaced from each other;

a second lever pivotally mounted at the middle portion thereof so as to be able to rock within a plane intersecting the axis of rotation of the other of said pair of reel shafts between a first position where one end portion of said second lever abuts against said other reel shaft to be frictionally engaged therewith and a second position where said one end portion thereof is separated from said other reel shaft;

a projection fixed to the other end portion of said second lever, said projection being separated from said pair of edges of said first lever when said first and second levers are located in their respective first positions, and abutting against one of said pair of edges to locate said second lever in said second position thereof when said first lever is located in said second position thereof, and abutting against the other of said pair of edges to locate said first lever in said second position thereof when said second lever is located in said second position thereof;

urging means for urging said first and second levers toward their respective first positions; and driving means for shifting said second lever from said first position to said second position thereof by shifting said first lever from said first position to said second position thereof when said one reel shaft serves as a take-up reel shaft, and for shifting said first lever from said first position to said second position thereof by shifting said second lever from said first position to said second position thereof when said other reel shaft serves as the take-up reel shaft.

2. A reel shaft braking device of a magnetic recording tape running apparatus according to claim 1, wherein the distance between said one end portion of said first lever and the center of rocking of said first lever is equal to the distance between said one end portion of said second lever and the center of rocking of said second lever, and the distance between said center of rocking of said first lever and said projection is equal to the distance between said center of rocking of said second lever and said projection.

3. A reel shaft braking device of a magnetic recording tape running apparatus according to claim 2, wherein the distance between said projection and one of said pair of edges on the movement locus of said projection is equal to the distance between said projection and the other of said pair of edges on said movement locus when said first and second levers are located in their respective first positions.

* * * * *